United States Patent [19]

Coombs et al.

[11] Patent Number: 4,671,866
[45] Date of Patent: Jun. 9, 1987

[54] HYDRODEMETALLIZATION OF OILS

[75] Inventors: Daniel M. Coombs, Borger, Tex.; Gerhard P. Nowack, Bartlesville, Okla.; Brent J. Bertus, Bartlesville, Okla.; Simon G. Kukes, Bartlesville, Okla.

[73] Assignee: Phillips Petroleum Company, Bartlesville, Okla.

[21] Appl. No.: 832,937

[22] Filed: Feb. 26, 1986

[51] Int. Cl.$^4$ .................... C10G 45/00; C10G 45/04
[52] U.S. Cl. ..................... 208/251 H; 208/213; 208/216 PP; 208/122; 208/254 H
[58] Field of Search ............ 208/251 H, 216 PP, 213, 208/254 H, 122

[56] References Cited

U.S. PATENT DOCUMENTS

| | | | |
|---|---|---|---|
| 3,507,784 | 4/1970 | O'Hara | 208/216 |
| 4,233,184 | 11/1980 | Cull | 252/437 |
| 4,440,631 | 4/1984 | Togari et al. | 208/212 |
| 4,441,992 | 4/1984 | Kimble | 208/251 H |
| 4,444,655 | 4/1984 | Shiroto et al. | 208/210 |
| 4,450,068 | 5/1984 | Kukes | 208/251 H |
| 4,457,835 | 7/1984 | Kukes | 208/251 H |
| 4,507,402 | 3/1985 | Kukes | 502/208 |
| 4,560,466 | 12/1985 | Kukes et al. | 208/251 H |

Primary Examiner—Andrew H. Metz
Assistant Examiner—Helane E. Myers
Attorney, Agent, or Firm—K. K. Brandes

[57] ABSTRACT

A process for removing metals from a hydrocarbon-containing feed stream comprises hydrotreatment in the presence of a solid catalyst composition comprising aluminum phosphate, zirconium phosphate and copper phosphate (preferably coprecipitated).

19 Claims, No Drawings

HYDRODEMETALLIZATION OF OILS

BACKGROUND OF THE INVENTION

In one aspect, this invention relates to a process for removing metals from a substantially liquid hydrocarbon containing feed stream, which also contains metal compounds as impurities. In another aspect, this invention relates to the use of a new, efficient, solid metal phosphate catalyst composition in a hydrotreating process for removing metals from a substantially liquid hydrocarbon containing feed steam.

It is well known that crude oil, heavy petroleum products, products from extraction and/or liquifaction of coal and lignite, products from tar sands, products from shale oil and similar products may contain metals such as vanadium, nickel, iron and arsenic. When these hydrocarbon-containing feeds are fractionated, the metals tend to concentrate in the heavier fractions such as the topped crude and residuum. The presence of these metals makes further processing of these heavier fractions difficult since the metals generally act as poisons for catalysts employed in downstream processes such as catalytic cracking, hydrogenation, hydrodesulfurization or hydrodenitrogenation. There are known processes for removing these metals from hydrocarbon-containing feeds. However, there is an ever present need to develop new, efficient hydrofining processes and catalyst compositions used therein.

SUMMARY OF THE INVENTION

It is thus an object of this invention to provide a process for removing metals from a substantially liquid hydrocarbon-containing feed stream so as to improve the processability of such a hydrocarbon-containing feed stream and especially improve the processability of heavier fractions such as topped crude and residuum. It is also an object of this invention to employ a mixed metal phosphate as catalyst composition for the demetallization of hydrocarbon-containing feed streams. Other objects and advantages will become apparent from the detailed description and the appended claims.

In accordance with the present invention, a substantially liquid hydrocarbon-containing feed stream, which also contains metals, is contacted with a free hydrogen containing gas in the presence of a catalyst composition comprising aluminum phosphate, zirconium phosphate and copper phosphate, under such conditions as to obtain a hydrocarbon-containing liquid product stream having a reduced concentration of metals (i.e., containing a smaller amount of metals per volume than the feed stream). It is believed that the metals contained in heterocyclic compounds such as porphyrins are removed from the heterocyclic compounds by the combination of heat, hydrogen and the catalyst composition of the present invention and are trapped in pores of the catalyst composition. Removal of the metals from the hydrocarbon containing feed stream in this manner provides for improved processability of the hydrocarbon-containing feed stream in processes such a catalytic cracking, hydrogenation, hydrodesulfurization and hydrodenitrogenation.

In a preferred embodiment, the catalyst composition employed in the process of this invention comprises mixed orthophosphates of Al, Zr and Cu. More preferably, the catalyst composition consists essentially of a coprecipitate of aluminum orthophosphate, zirconium orthophosphate and copper(II) orthophosphate.

DETAILED DESCRIPTION OF THE INVENTION

Any metal which can be trapped in the pores of the catalyst composition of the present invention can be removed from a hydrocarbon-containing feed stream in accordance with the present invention. The present invention is particularly applicable to the removal of vanadium and nickel.

Metals can be removed from any suitable hydrocarbon-containing feed streams. Suitable hydrocarbon-constaining feed streams include petroleum, petroleum products, coal pyrolyzates, products from extraction and/or liquifaction of coal and lignite, products from tar sands, shale oil, products from shale oil and similar products. Suitable hydrocarbon-containing feed streams include full-range heavy crude oils, topped crudes having a boiling range in excess of about 400° F. and residua. However, the present invention is particularly directed to heavy feed streams such as heavy topped crudes and residua and other materials which are generally regarded as being too heavy to be distilled. These materials will generally contain the highest concentrations of metals such as vanadium and nickel, generally about 5–500 ppmw (parts per million parts of feed by weight) of Ni and 10–1,000 ppmw of V. In addition, these feed streams also contain sulfur compounds (generally about 0.5–8 weight-% S), nitrogen compounds (generally about 0.2–3 weight-% N), and coke precursors (generally about 0.1–30 weight-% Ramsbottom carbon residue; determined according to ASTM D524). The API$^{60}$ gravity of these feed streams generally is in the range of from about 4 to about 30. The term "substantially liquid feed stream" as used herein means that the feed stream is substantially liquid at the contacting conditions of the process of this invention.

The demetallization catalyst employed in the process of the present invention is a solid composition comprising aluminum phosphate, zirconium phosphate and copper phosphate. As used herein, the term phosphate includes orthophosphates, pyrophosphates, metaphosphates and polyphosphates. Presently preferred are the mixed orthophosphates of aluminum, zirconium and copper (copper being in the valence state of +2).

The presently more preferred catalyst composition comprises (most preferably consists essentially of) a coprecipitate of aluminum orthophosphate, zirconium orthophosphate and copper(II) orthophosphate.

The catalyst composition used in the process of this invention can be prepared by any suitable method. Coprecipitation is preferred because the catalyst composition is believed to be more effective when prepared by coprecipitation. The catalyst is generally prepared by coprecipitating any suitable aluminum salt, any suitable zirconium salt and any suitable copper salt with any suitable phosphate. The coprecipitation may be carried out in any suitable solvent such as water or alcohol, with water being the preferred solvent. The metal salts and the phosphate must be soluble in the solvent used to be suitable.

If a phosphate such a diamonium phosphate is utilized, the pH of the solution will generally be such that precipitation will occur. However, if other phosphates are used, it may be necessary to add a base such as ammonia to achieve a pH which will result in the desired precipitation.

The precipitate formed is separted from the solution from which it is formed, washed, dried and calcined in the presence of a free oxygen containing gas such as air or in an inert gas atmosphere such as nitrogen to form the catalyst composition. Presently preferred is air as the calcining atmosphere.

The drying of the precipitant can be accomplished at any suitable temperature. Generally a temperature of about 20° C. to about 200° C., preferably about 100° C. to about 150° C. is utilized for a time in the range of about 1 hour to about 30 hours.

The calcining step is utilized to remove traces of anions such as nitrates, traces of carbon and water and to make the structure of the catalyst composition harder. Any suitable calcining temperature can be utilized. Generally the calcining temperature will be in the range of about 300° C. to about 800° C., with a temperature in the range of about 400° C. to about 650° C. being preferred, for a time in the range of from about 0.5 to about 24 hours, preferably from about 1 to about 6 hours.

The catalyst composition can have any suitable surface area and pore volume. In general, the surface area (determined by BET/$N_2$; ASTM D3037) will be in the range of from about 2 to about 400 $m^2/g$, preferably from about 10 to about 200 $m^2/g$, while the pore volume (measured by mercury intrusion using an Autopore 9200 instrument of Micromeretics, Norcross, Ga.) will be in the range of from about 0.2 to about 4.0 cc/g, preferably from about 0.4 to about 2.0 cc/g.

Any suitable phosphates can be utilized to prepare the catalyst composition. Suitable phosphates include $(NH_4)H_2PO_4$, $(NH_4)_2HPO_4$, $(NH_4)_3PO_4$, $(NH_4)_4P_2O_7$, corresponding phosphates and pyrophosphates of lithium, sodium, potassium, cesium, $H_3PO_4$ and $H_3PO_3$. Phosphonic acids such as phenyl phosphonic acids and the metal and ammonium salts of phosphonic acids may also be used to derive phosphates for the catalyst composition if desired. Presently preferred is $(NH_4)_2HPO_4$.

Suitable metal compounds (salts) that can be utilized to prepare the catalyst composition include $CuSO_4$, $Cu_2SO_4$, $Cu(NO_3)_2$, $CuNO_3$, $CuCl_2$, Cu(II) acetate and the like; $Zr(NO_3)_4$, $ZrO(NO_3)_2$, $ZrOSO_4$, $ZrOCl_2$ and the like; $AlCl_3$, $Al(NO_3)_3$, $Al_2(SO_4)_3$, $NH_4Al(SO_4)_2$, $KAl(SO_4)_2$, $Al(OH)Cl_2$ and the like. Presently preferred metal salts are $Cu(NO_3)_2.3H_2O$, $AlCl_3.6H_2O$ and $ZrOCl_2.4H_2O$.

Optionally, the above-described coprecipitation of Al-Zr-Cu phosphate (which can also be referred to as Cu-Zr-Al phosphate) can be carried out from an aqueous solution containing at least one finely dispersed inorganic refractory material therein, thus producing a mixture of aluminum phosphate, zirconium phosphate, copper phosphate and such inorganic refractory material. Non-limiting examples of such inorganic refractory materials are alumina, silica, aluminosilicates (e.g., zeolites), titania, zirconia and magnesia, preferably alumina. When such a refractory material is present (presently not preferred), the amount of this material in the entire mixture generally is in the range of about 1 to about 90 weight-%, preferably in the range of about 1 to about 50 weight-%.

Any suitable ratio of aluminum, zirconium and copper to phosphorus in the catalyst composition can be used. Preferably this ratio will be stoichiometric. The weight ratio of the sum of metals (Al+Zr+Cu) to phosphorus will generally be in the range of about 1:1 to about 4:1. Any suitable ratio of aluminum to copper can be used. The atomic ratio of aluminum to copper will generally be in the range of from about 1:5 to about 8:1, preferably in the range of from about 1:2 to about 5:1. Any suitable ratio of zirconium to copper may be used. The atomic ratio of zirconium to copper will generally be in the range of about 1:10 to about 10:1 and more preferably in the range of about 1:2 to about 5:1.

The demetallization process of this invention can be carried out by means of any apparatus whereby there is achieved a contact of the catalyst composition with the hydrocarbon-containing feed stream and a free hydrogen containing gas under suitable demetallization conditions. The process is in no way limited to the use of a particular apparatus. The process of this invention can be carried out as a batch process or, preferably, as a continuous process. The process of this invention can be carried out using a fixed catalyst bed, a fluidized catalyst bed, a moving catalyst bed or a slurry of the catalyst in the feed. Presently preferred is a fixed catalyst bed.

The catalyst composition can be used alone in the reactor or can be used in combination with substantially inert (i.e., unpromoted) materials such as alumina, silica, titania, magnesia, metal silicates, metal aluminates, alumino-silicates, metal titanates, metal phosphates and the like, and mixtures thereof. A layer of the inert material and a layer of the catalyst composition may be used, or the catalyst composition can be mixed with the inert material. Use of the inert material provides for better dispersion of the hydrocarbon containing feed stream. Also other catalysts such as known hydrogenation and desulfurization catalysts (such as $Co/Mo/Al_2O_3$ and $Ni/Mo/Al_2O_3$) may be used in the reactor to achieve simultaneous demetallization, desulfurization and hydrogenation or hydrocracking if desired. However, the presence of such hydrogenation and desulfurization catalysts in the proces of this invention is presently not preferred.

Any suitable reaction time (contact time) between the catalyst composition, hydrogen and the hydrocarbon containing feed stream can be utilized. In general, the contact time will range from about 0.1 hours to about 10 hours. Preferably, the reaction time will range from about 0.4 to about 4 hours. Thus the flow rate of the hydrocarbon-containing feed stream in a continuous operation should be such that the time required for the passage of the mixture through the reactor (residence time) will be in the range of from about 0.1 to about 10 hours, and preferably be in the range of from about 0.4 to about 4 hours. This generally requires a liquid hourly space velocity (LHSV) in the range of about 0.10 to about 10 cc of oil feed per cc of catalyst per hour, preferably from about 0.2 to about 2.5 cc/cc/hr.

The demetallization process of the present invention can be carried out at any suitable temperature. The process temperature will generally be in the range of about 250° C. to about 550° C. and will preferably be in the range of about 350° C. to about 450° C. Higher temperatures do improve the removal of metals but will generally not be utilized if they have adverse effects on the hydrocarbon containing feed stream, such as excessive coking. Also economic considerations must be taken into account. Lower temperatures can generally be used for light feeds.

Any suitable pressure can be utilized in the demetallization process of this invention. The reaction pressure will generally be in the range of about atmospheric (0 psig) to about 5,000 psig. Preferably, the pressure will be in the range of from about 100 to about 2500 psig. Higher pressures tend to reduce coke formation but operation at high pressure may have adverse economic consequences.

Any suitable quantity of hydrogen gas can be added to the demetallization process. The quantity of hydrogen used to contact the hydrocarbon containing feed stock will generally be in the range of about 100 to about 10,000 standard cubic feet (SCF) hydrogen per barrel of the hydrocarbon-containing feed stream and will more preferably be in the range of about 1000 to about 6000 SCF $H_2$ per barrel of the hydrocarbon-containing feed stream. Hydrogen can be employed as essentially pure hydrogen gas or as a mixture with other gases such as CO, $CO_2$, $H_2S$, $N_2$, inert gases such as helium, low paraffins such as methane and the like.

In general, the catalyst composition is utilized for demetallization until a satisfactory level of metals (preferably Ni and V) removal fails to be achieved which is believed to result from the coating of the catalyst composition with coke and the metals being removed. It is possible to remove the metals from the catalyst composition by certain leaching procedures but these procedures are expensive, and it is generally contemplated that once the removal of metals falls below a desired level, the used catalyst will simply be replaced by a fresh catalyst.

The time in which the catalyst composition will maintain its activity for removal of metals will depend upon the metals concentration in the hydrocarbon containing feed streams being treated. It is believed that the catalyst composition may be used for a period of time long enough to accumulate 20-200 weight-% of metals, mostly Ni and V, based on the weight of the catalyst composition, from oils.

The life of the catalyst composition and the efficiency of the demetallization process are belived to be improved by introducing a decomposable metal compound into the hydrocarbon containing feed stream. The metal in the decomposable metal compound can be selected from the group consisting of transition metals of Group IIB, Group IIIB, Group IVB, Group V-B, Groups VI-B, Groups VII-B and Group VIII, of the Periodic Table (as defined in "College Chemistry" by W. H. Nebergall et al, Fourth Edition, 1972, D. C. Heath and Co.). Preferred metals are molybdenum, tungsten, manganese, zirconium and the like. Molybdenum is a particularly preferred metal which may be introduced as a carbonyl, acetate, acetylacetonate, octoate (octanoate), naphthenate, dithiophosphate or dithiocarbamate. Presently more preferred is $Mo(CO)_6$ or a molybdenum dithiophosphate or a molybdenum dithiocarbamate or a mixture of these compounds.

Any suitable concentration of the additive may be added to the hydrocarbon-containing feed stream. In general, a sufficient quantity of the additive will be added to the hydrocarbon containing feed stream to result in a concentration of the metal (preferably Mo) in the feed in the range of from about 1 to about 1000 parts per million and more preferably in the range of about 5 to about 100 parts per million (i.e., parts per weight of Mo per million parts by weight of hydrocarbon-containing feed).

The following examples are presented in further illustration of the invention.

EXAMPLE I

This example illustrates the preparation of various mixed, coprecipitated copper phosphates, which were employed as hydrofining catalysts.

Control Catalyst A was coprecipitated Zr-Cu phosphate, which was prepared as follows: A first solution was prepared by dissolving 100.06 grams (0.4 mole) of $ZrOCl_2.4H_2O$ and 96.6 grams (0.4 mole) of $Cu(NO_3)_2.3H_2O$ in 1 liter of deionized water and then adding 18 cc of aqueous ammonia (so as to raise the pH of the solution from 0.4 to 1.3). This first solution was stirred for 15 minutes at 50° C. Then a second solution, prepared by dissolving 142.72 grams (1.08 mole) of $(NH_4)_2HPO_4$ in 400 cc of deionized water (pH of the second solution: 8.3), was added to the first solution. The mixture of the two solutions was stirred for 30 minutes at 50° C. and then filtered. The filter cake was slurried in water, collected again on a filter and dried for about 16 hours at 120° C. The Cu-Zr-phsophate material was calcined for 4 hours at 500° C. and then ground. A 20/40 mesh sieve fraction was collected. The surface area SA (determined by the mercury intrusion method) of this fraction was 102.8 $m^2/g$; its total pore volume PV (determined by mercury intrusion) was 1.16 cc/g; its calculated average pore diameter (4PV÷SA) was 450 A; and its bulk density (weight of 1 cc of poured material) was 0.737 g/cc.

Control Catalyst B was coprecipitated Al-Cu phosphate, which was prepared as follows. A first solution was prepared by dissolving 96.5 grams (0.4 mole) of $AlCl_3.6H_2O$ and 96.6 grams of $Cu(NO_3)_2.3H_2O$ in 1 liter of distilled water, stirring at 40° C. until the solution was clear, and then adding 9 cc of aqueous ammonia (so as to raise the pH of the solution from 2.8 to 3.5). A second solution, prepared by dissolving 142.72 grams of $(NH_4)_2HPO_4$ in 400 cc of distilled water (pH of the second solution: 8.4), was added to the first solution. The mixture of the two solutions was filtered, the filter cake was slurried in 1 liter of water, and the slurry was filtered. The thus obtained filter cake was dried for about 16 hours at 120° C. and subsequently calcined for 4 hours at 500° C. The calcined material was ground and sieved, and a 20/40 mesh fraction was collected. This sieve fraction had a surface area of 223.4 $m^2/g$, a total pore volume of 3.65 cc/g, an average calculated pore diameter of 653 A, and a bulk density of 0.249 cc/g.

Invention Catalyst C was coprecipitated Al-Zr-Cu phosphate (also referred to as Cu-Zr-Al phosphate), which was prepared as follows. A first solution was prepared by dissolving 48.3 grams (0.2 mole) of $AlCl_3.6H_2O$, 50.0 grams (0.2 mole) of $ZrOCl_2.4H_2O$ and 46.3 grams (0.2 mole) of $Cu(NO_3)_2.2.5H_2O$ in 600 cc of distilled water, stirring at 58° C. for 30 minutes and adding 15 ml of aqueous ammonia (so as to raise the pH of the solution from 0.3 to 2.2). Then a second solution was prepared by dissolving 71.8 grams of $(NH_4)_2HPO_4$ in 300 cc of distilled water so as to make a 0.54 molar solution of $(NH_4)_2HPO_4$ (pH: 8.8), heating for 30 minutes at 48° C., and adding 15 cc of aqueous ammonia (so as to raise the pH of the second solution to 10.0). The second solution was added to the first solution with stirring for 2-3 minutes. The mixture of the two solutions was filtered, the filter cake was slurried in 1 liter of distilled water, and the slurry was filtered. The thus obtained filter cake was dried for about 16 hours at 120° C., calcined for 4 hours at 500° C., ground and sieved. A 20/40 mesh sieve fraction was collected, which had a surface area of 112.3 m²/g, a total pore volume of 1.03 cc/g, a calculated average pore diameter of 367 A and a bulk density of 0.762 g/cc.

Invention Catalyst D was also coprecipitated Al-Zr-Cu phosphate. It was prepared substantially in accordance with the method described for Catalyst C, except that a 0.8 molar solution of $(NH_4)_2HPO_4$ was used as second solution and no ammonia was added to this second solution. The calcined Catalyst D had a surface area of 127.4 m²/g, a total pore volume of 1.22 cc/g, a calculated average pore diameter of 384 A and a bulk density of 0.684 g/cc.

EXAMPLE II

This example illustrates the experimental setup for investigating the demetallization of heavy oils by employing various phosphate catalysts. A heavy oil feed was pumped by means of a LAPP Model 211 (General Electric Company) pump to a metallic mixing T-pipe where it was mixed with a controlled amount of hydrogen gas. The oil/hydrogen mixture was pumped downward through a stainless steel trickle bed reactor, 28.5 inches long and 0.75 inches in diameter, fitted inside with a 0.25 inch O.D. axial thermocouple well. The reactor was filled with a top layer (3.5 inches below the oil/$H_2$ feed inlet) of 50 cc of low surface area (less than 1 m²/gram) α-alumina, a middle layer of 50 cc of phosphate catalyst and a bottom layer of 50 cc of α-alumina. The reactor tube was heated by a Thermcraft (Winstom-Salem, N.C.) Model 211 3-zone furnace. The reactor temperature was usually measured in four locations along the reactor bed by a traveling thermocouple that was moved within the axial thermocouple well. The liquid product was collected in a receiver, filtered through a glass frit and analyzed. Exiting hydrogen gas was vented. Vanadium and nickel contents in oil were determined by plasma emission analysis.

The heavy oil feed was a 400 F+ Maya resid containing 64 ppmw Ni, 331 ppmw V and about 4 weight-% S. All hydrofining (hydrodemetallization) tests were carred out at 760° F., 1400 psig, about 1.0 LHSV (liquid hourly space velocity, i.e., cc oil feed per cc catalyst per hour) and 2,500 standard cubic feet of added $H_2$ per barrel of oil. Test results are summarized in Table I.

4,457,835) or Al-Cu-PO$_4$ as catalysts (Runs 1 and 2), especially for a test period of 2-4 days, after test conditions and catalyst performance had stabilized.

EXAMPLE III

As has been demonstrated in Example V of U.S. Pat. No. 4,457,835 (incorporated herein by reference), the addition about 70 ppm Mo as $Mo(CO)_6$ to a heavy oil feed that was hydrotreated in the presence of a nickel phosphate-zirconium phosphate catalyst resulted in enhanced removal of nickel and vanadium form this heavy oil feed. Based on these results, it is concluded that the addition of $Mo(CO)_6$ or of another suitable decomposable transition metal compound to the feed will also reult in enhanced removal of Ni and V and in increased catalyst life when a catalyst composition comprising aluminum phosphate, zirconium phosphate and copper phosphate is employed.

Reasonable variations and modifications are possible within the scope of the disclosure and the appended claims.

We claim:

1. A process for demetallizing a substantially liquid hydrocarbon-containing feed stream comprising the step of contacting said feed stream, which also contains metals, with a free hydrogen containing gas in the presence of a solid catalyst composition comprising aluminum phosphate, zirconium phosphate and copper phosphate, under such contacting conditions as to obtain a hydrocarbon-containing liquid product stream having a reduced concentration of metals.

2. A process in accordance with claim 1 wherein said metals contained in said hydrocarbon-containing feed stream are nickel and vanadium.

3. A process in accordance with claim 2 wherein said hydrocarbon-containing feed stream contains about 5-500 ppmw nickel and about 10-1,000 ppmw vanadium.

4. A process in accordance with claim 1 wherein said solid catalyst composition comprises aluminum orthophosphate, zirconium orthophosphate and copper(II) orthophosphate.

5. A process in accordance with claim 4 wherein said solid catalyst composition comprises a coprecipitate of aluminum orthophosphate, zirconium orthophosphate and copper(II) orthophosphate.

TABLE I

| Run | Catalyst | Run Time (Days) | LHSV (cc/cc/Hs) | % Removal of Ni and V | | |
|---|---|---|---|---|---|---|
| | | | | Actual | Corrected[1] | Average[2] |
| 1 (Control) | A (Zr—Cu—PO$_4$) | 1 | 0.90 | 41.7 | 38.5 | 28.0 |
| | | 2 | 0.98 | 25.3 | 24.8 | |
| | | 3 | 0.96 | 21.5 | 20.7 | |
| 2 (Control) | B (Al—Cu—PO$_4$) | 1 | 1.04 | 14.9 | 15.5 | 8.9 |
| | | 2 | 1.08 | 2.8 | 3.0 | |
| | | 3 | 0.98 | 8.4 | 8.2 | |
| 3 (Invention) | C (Al—Zr—Cu—PO$_4$) | 1 | 1.37 | 20.0 | 26.3 | 31.7 |
| | | 2 | 1.06 | 33.4 | 35.0 | |
| | | 2 | 1.15 | 28.9 | 32.4 | |
| | | 3 | 1.00 | 30.4 | 30.4 | |
| | | 4 | 1.08 | 32.2 | 34.2 | |
| 4 (Invention) | D (Al—Zr—Cu—PO$_4$) | 1 | 1.00 | 35.2 | 35.2 | 30.5 |
| | | 2 | 1.12 | 26.3 | 29.0 | |
| | | 2 | 1.00 | 23.8 | 23.8 | |
| | | 3 | 1.20 | 25.8 | 30.1 | |
| | | 4 | 1.12 | 31.4 | 34.4 | |

[1] Corrected for LHSV of 1.0, using first order rate constants
[2] Average of corrected % removal of Ni and V Test results in Table I clearly show that the % removal of Ni and V was unexpectedly higher in the presence of Al-Zr-Cu-PO$_4$ catalysts (Runs 3 and 4) than in the presence of either Zr-Cu-PO$_4$ (U.S. Pat. No.

6. A process in accordance with claim 1 wherein said solid catalyst composition has a surface area in the range of from about 2 to about 400 m²/g and a pore volume in the range of from about 0.2 to about 4.0 cc/g.

7. A process in accordance with claim 6 wherein said solid catalyst composition has a surface area in the range of from about 10 to about 200 m²/g and a pore volume in the range of from about 0.4 to about 2.0 cc/g.

8. A process in accordance with claim 1 wherein the ratio of the combined weight of (Al+Zr+Cu) to the weight of phosphorus in said solid catalyst composition is in the range of from about 1:1 to about 4:1.

9. A process in accordance with claim 1 wherein in said solid catalyst composition the atomic ratio of Al to Cu is in the range of from about 1:5 to about 8:1 and the atomic ratio of Zr to Cu is in the range of from about 1:10 to about 10:1.

10. A process in accordance with claim 9 wherein said atomic ratio of Al to Cu is in the range of from about 1:2 to about 5:1 and said atomic ratio of Zr to Cu is in the range of from about 1:2 to about 5:1.

11. A process in accordance with claim 9 wherein said solid catalyst composition has been calcined at a temperature in the range of from 300° to about 600° C. for a period of time in the range of from about 0.5 to about 24 hours.

12. A process in accordance with claim 1 wherein said contacting conditions comprise a temperature in the range of from about 250° to about 550° C., a pressure in the range of from about 0 to abot 5,000 psig, a quantity of added hydrogen gas in the range of from about 100 to about 10,000 SCF H₂ per barrel of hydrocarbon-containing feed, and a contact time in the range of from about 0.1 to about 10 hours.

13. A process in accordance with claim 12 wherein said contacting conditions comprise a temperature in the range of from about 350° to about 450° C., a pressure in the range of from about 100 to about 2,500 psig, a quantity of added hydrogen gas in the range of from about 1,000 to about 6,000 SCF H₂ per barrel of hydrocarbon-containing feed, and a contact time of from about 0.4 to about 4 hours.

14. A process in accordance with claim 1 wherein a decomposable compound of a metal selected from the group consisting of transition metals of Group IIB, Group IIIB, Group IVB, Group VB, Group VIB, Group VIIB, and Group VIII of the Periodic Table has been added to said hydrocarbon-containing feed stream.

15. A process in accordance with claim 14 wherein said decomposable compound of a metal is selected from the group consisting of molybdenum hexacarbonyl, a molybdenum dithiophosphate, a molybdenum dithiocarbamate and mixtures thereof, and the concentration of added Mo in said hydrocarbon-containing feed stream is in the range of from about 5 to about 200 parts per million.

16. A process in accordance with claim 1 wherein said solid catalyst composition is used as a fixed catalyst bed and said contacting is carried out in a continuous operation.

17. A process in accordance with claim 5, wherein said coprecipitate is formed by adding diammonium phosphate to an aqueous solution comprising water-soluble salts of aluminum, zirconium and copper.

18. A process in accordance with claim 17 wherein said aqueous solution comprises $Cu(NO_3)_2$, $AlCl_3$ and $ZrOCl_2$.

19. A process in accordance with claim 5, wherein said coprecipitate has been calcined at a temperature in the range of from about 300° to about 800° C.

* * * * *